United States Patent
Sugioka et al.

(10) Patent No.: US 12,449,365 B2
(45) Date of Patent: Oct. 21, 2025

(54) RAMAN SCATTERING SPECTROMETRIC APPARATUS AND RAMAN SCATTERING SPECTROSCOPIC METHOD

(71) Applicant: RIKEN, Wako (JP)

(72) Inventors: Koji Sugioka, Wako (JP); Shi Bai, Wako (JP)

(73) Assignee: RIKEN, Wako (JP)

( * ) Notice: Subject to any disclaimer, the term of this patent is extended or adjusted under 35 U.S.C. 154(b) by 202 days.

(21) Appl. No.: 18/010,497

(22) PCT Filed: Jun. 7, 2021

(86) PCT No.: PCT/JP2021/021620
§ 371 (c)(1),
(2) Date: Dec. 15, 2022

(87) PCT Pub. No.: WO2021/256320
PCT Pub. Date: Dec. 23, 2021

(65) Prior Publication Data
US 2023/0236129 A1  Jul. 27, 2023

(30) Foreign Application Priority Data
Jun. 16, 2020 (JP) ................... 2020-103730

(51) Int. Cl.
*G01N 21/65* (2006.01)
*G01J 3/44* (2006.01)

(52) U.S. Cl.
CPC ............... *G01N 21/65* (2013.01); *G01J 3/44* (2013.01); *G01N 21/658* (2013.01); *G01N 2201/06113* (2013.01)

(58) Field of Classification Search
CPC ............ G01N 21/65; G01N 21/658; G01N 2201/06113; G01J 3/44
See application file for complete search history.

(56) References Cited

U.S. PATENT DOCUMENTS

| 6,943,031 B2 * | 9/2005 | Farquharson ...... B01J 20/28047 436/166 |
| 2005/0084980 A1 * | 4/2005 | Koo .................... G01J 3/44 436/171 |

(Continued)

FOREIGN PATENT DOCUMENTS

| CN | 103785492 A | 5/2014 |
| JP | 2014-10154 A | 1/2014 |
| WO | WO 2015/148038 A1 | 10/2015 |

OTHER PUBLICATIONS

Bai et al., "3D Microfluidic Surface-Enhanced Raman Spectroscopy (SERS) Chips Fabricated by All-Femtosecond-Laser-Processing for Real-Time Sensing of Toxic Substances", Advanced Functional Materials, vol. 28, 2018, pp. 1-10.

(Continued)

*Primary Examiner* — Rufus L Phillips
(74) *Attorney, Agent, or Firm* — Birch, Stewart, Kolasch & Birch, LLP (57) ABSTRACT

The Raman scattering spectroscopic method according to the present invention include: preparing a chip having a channel in which a nanostructure is formed; introducing an analyte solution into a part of the channel in the chip; irradiating an interface of the analyte solution with a laser beam; and measuring Raman scattering light induced by the irradiation of the laser beam. The measurement may be performed, with a fixed laser beam irradiation position, both in a state where the interface of the analyte solution is included in the laser-beam-irradiation area and in a state where the interface of the analyte solution is not included in the laser-beam-irradiation area, or may be performed keeping the state where the interface of the analyte solution is maintained in the laser-beam-irradiation area by controlling the laser-beam-irradiation area according to the movement of the interface due to evaporation of the analyte solution.

5 Claims, 7 Drawing Sheets (56) References Cited

U.S. PATENT DOCUMENTS

| | | | |
|---|---|---|---|
| 2009/0213369 A1* | 8/2009 | Lee | B82Y 5/00 |
| | | | 424/617 |
| 2012/0236299 A1* | 9/2012 | Chiou | G01N 29/2418 |
| | | | 239/10 |
| 2014/0002816 A1 | 1/2014 | Liu et al. | |
| 2018/0275066 A1* | 9/2018 | Ge | G01N 21/648 |
| 2018/0284010 A1* | 10/2018 | Scarcelli | G16B 20/00 |
| 2020/0158646 A1* | 5/2020 | Tsen | G01N 1/34 |

OTHER PUBLICATIONS

Bai et al., "Attomolar Sensing Based on Liquid Interface-Assisted Surface-Enhanced Raman Scattering in Microfluidic Chip by Femtosecond Laser Processing", Applied Materials & Interfaces, vol. 12, Oct. 17, 2020, pp. 42328-42338.

Barmi et al., "Aggregation Kinetics of SERS-Active Nanoparticles in Thermally Stirred Sessile Droplets", Langmuir, vol. 29, Oct. 1, 2013, 13614-13623.

Yan et al., "Optimal Hotspots of Dynamic Surfaced-Enhanced Raman Spectroscopy for Drugs Quantitative Detection", Analytical Chemistry, vol. 89, Mar. 30, 2017, pp. 4875-4881.

Yan et al., "Rapid, One-Step Preparation of SERS Substrate in Microfluidic Channel for Detection of Molecules and Heavy Metal Ions", Spectrochimica Acta Part A: Molecular and Biomolecular Spectroscopy, vol. 220, May 17, 2019, pp. 1-8.

Zhou et al., "Review of Microfluidic Approaches for Surface-Enhanced Raman Scattering", Sensors and Actuators B: Chemical, vol. 227, Dec. 29, 2015, pp. 504-514.

* cited by examiner

RAMAN SCATTERING SPECTROMETRIC APPARATUS AND RAMAN SCATTERING SPECTROSCOPIC METHOD

TECHNICAL FIELD

The present invention relates to a Raman scattering spectrometric apparatus and a Raman scattering spectroscopic method.

BACKGROUND ART

SERS (Surface-Enhanced Raman Scattering) is a phenomenon in which the intensity of Raman scattering is much enhanced by molecules adsorbed on rare metal surfaces with nanoscale structures as compared to that on a bulk substrate, and has been widely used for high-sensitivity analysis techniques in many fields such as trace material analysis, pathological diagnosis, environmental measurement, food safety control, and so on. Theoretically, the enhancement factor of surface-enhanced Raman scattering as compared to Raman scattering on the bulk substrate is expected to be $10^{12}$ or more. In actual SERS analysis, however, the enhancement factor is mostly about $10^6$ to $10^8$, and detection at femtomolar (fM) or smaller levels is not possible.

SERS analysis methods that have been developed to allow detection at fM or smaller concentrations include techniques that utilize nanogaps formed by self-aggregation of metal nanoparticles densely dispersed in a solution and left after the evaporation of the solution (NPL 1 and NPL 2). According to this technique, however, the metal nanoparticles aggregate completely together after the solution has completely evaporated and a large enhancement factor is then no longer acquired. This technique allows for detection at fM or smaller levels only for a fixed period of time during the measurement, and therefore is called dynamic SERS or transient SERS.

CITATION LIST

Non Patent Literature

[NPL 1] Barmi, M. R.; Andreou, C.; Hoonejani, M. R.; Moskovits, M.; Meinhart, C. D. Aggregation Kinetics of SERS-Active Nanoparticles in Thermally Stirred Sessile Droplets, Langmuir 2013, 29, 13614-13623.

[NPL 2] Yan, X.; Li, P.; Zhou, B.; Tang, X.; Li, X.; Weng, S.; Yang, L.; Liu, J. Optimal Hotspots of Dynamic Surface-Enhanced Raman Spectroscopy for Drugs Quantitative Detection, Anal. Chem. 2017, 89, 4875-4881.

[NPL 3] Bai, S.; Serien, D.; Hu, A.; Sugioka, K.; 3D Microfluidic Surface-Enhanced Raman Spectroscopy (SERS) Chips Fabricated by All-Femtosecond-Laser-Processing for Real-Time Sensing of Toxic Substances, Adv. Func. Mater. 2018, 1706262.

SUMMARY OF INVENTION

Technical Problem

In consideration of the circumstance described above, an object of the present invention is to provide a Raman scattering spectroscopy technique that enables a continuous measurement with a high enhancement factor.

Solution to Problem

One aspect of the present invention is a Raman scattering spectrometric apparatus, comprising:

irradiation means for emitting a laser beam; and measuring means for measuring Raman scattering light induced by irradiation with the laser beam, wherein a measurement is performed by irradiating the laser beam to an interface of an analyte solution, the analyte solution being introduced into a part of a channel in a chip having the channel in which a nanostructure is formed.

The Raman scattering measurement performed in this way while irradiating an interface of the analyte solution with a laser beam provides a high signal enhancement factor.

The Raman scattering spectrometric apparatus according to this aspect may include the chip. The Raman scattering spectrometric apparatus according to this aspect may include solution introducing means for introducing the analyte solution into the part of the channel in the chip.

In this aspect, the irradiation position of the laser beam may be fixed, and the irradiation of the laser beam and the measurement of the Raman scattering light may be performed both in a state in which the interface of the analyte solution is included in the irradiation area of the laser beam and in a state in which the interface of the analyte solution is not included in the irradiation area of the laser beam.

The enhancement factor decreases somewhat in the state in which the analyte is not included in the irradiation area of the laser beam due to evaporation as compared to the measurement to the interface. Even so, a higher enhancement factor than that of conventional Raman scattering spectroscopy can be acquired. Accordingly, measurement can be performed continuously with a higher signal intensity than before.

The Raman scattering spectrometric apparatus according to this aspect may further include control means for controlling the irradiation position of the laser beam in accordance with a movement of the interface due to evaporation of the analyte solution.

According to this technique, a continuous measurement with a high signal intensity is made possible by carrying on the measurement at the interface of the solution.

In this aspect, the nanostructure may be a nano-dot structure or a nano-ripple structure formed to a metal thin film deposited on a channel surface.

Another aspect of the present invention is a Raman scattering spectroscopic method including the steps of:

preparing a chip having a channel in which a nanostructure is formed;

introducing an analyte solution into a part of the channel in the chip;

irradiating an interface of the analyte solution with a laser beam; and measuring Raman scattering light induced by the irradiation of the laser beam.

This aspect may further include a step of controlling the irradiation position of the laser beam in accordance with a movement of the interface due to evaporation of the analyte solution. In this aspect, the irradiation position of the laser beam may be fixed, and the irradiation of the laser beam and the measurement of the Raman scattering light may be performed both in a state in which the interface of the analyte solution is included in an irradiation area of the laser beam and in a state in which the interface of the analyte solution is not included in the irradiation area of the laser beam.

Advantageous Effects of Invention

The present invention enables a continuous Raman scattering spectroscopic measurement with a high enhancement factor.

BRIEF DESCRIPTION OF DRAWINGS

FIG. 8 (A) is an SEM image of a nano-dot structure of a metal thin film, and (B) is a graph showing the Raman signal intensity obtained by LI-SERS measurement using this nano-dot structure.

DESCRIPTION OF EMBODIMENTS

Summary

The present invention relates to a Raman scattering spectroscopy method that enables a measurement with a higher Raman scattering enhancement factor. More specifically, the present invention relates to a Raman scattering spectroscopy method that can achieve a detection sensitivity of 10 to 100 attomolar (aM) not only for a limited time but in a continuous manner.

Figure 3:
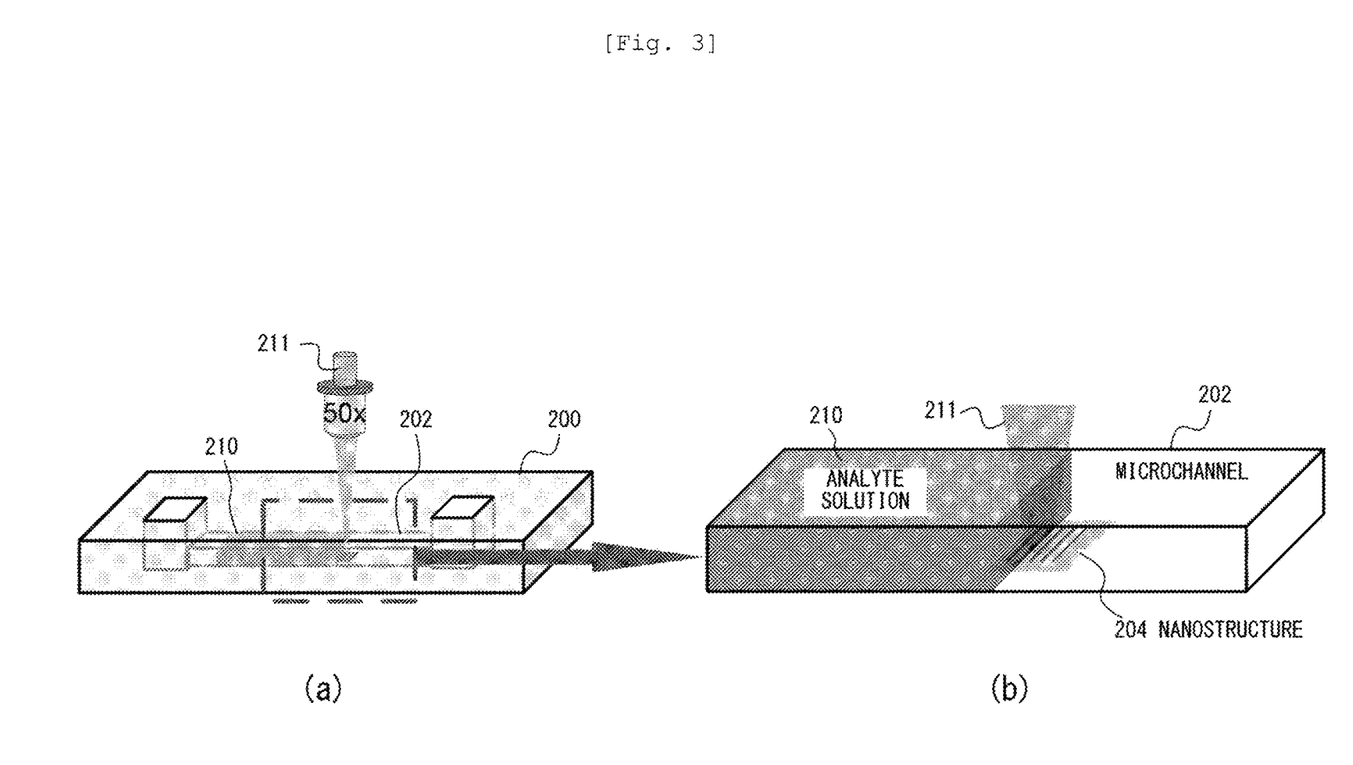
FIG. 3 is a diagram for explaining a Raman scattering spectroscopic method (LI-SERS) according to the embodiment.

The present invention is now described in summary. The present invention uses a 3D microfluidic SERS chip that includes a channel formed with a metal thin film nanostructure. An analyte solution is introduced into a part of the channel, and a Raman measurement is performed in a state where a liquid-gas interface of the analyte solution is positioned in the nanostructure 204 (FIG. 3). A considerably strong Raman signal is obtained during a period in which the analyte solution is located within the laser-irradiated area (dynamic mode). The analyte solution evaporates as the laser irradiation progresses so that the liquid interface moves gradually away from the laser-irradiated area, and the signal intensity accordingly lowers. Nevertheless, even after the solution within the laser-irradiated area has evaporated, a constant signal intensity is continuously acquired, this signal intensity being far higher than that obtained when the laser beam is emitted into the solution (static mode).

The present inventors have given the name Liquid-Interface assisted SERS (LI-SERS) spectroscopy to the Raman scattering measurement method according to the present invention because it is a technique that uses the liquid interface of the analyte solution. Herein this technique shall be also called liquid-interface assisted SERS or LI-SERS.

Apparatus Configuration

Figure 1:
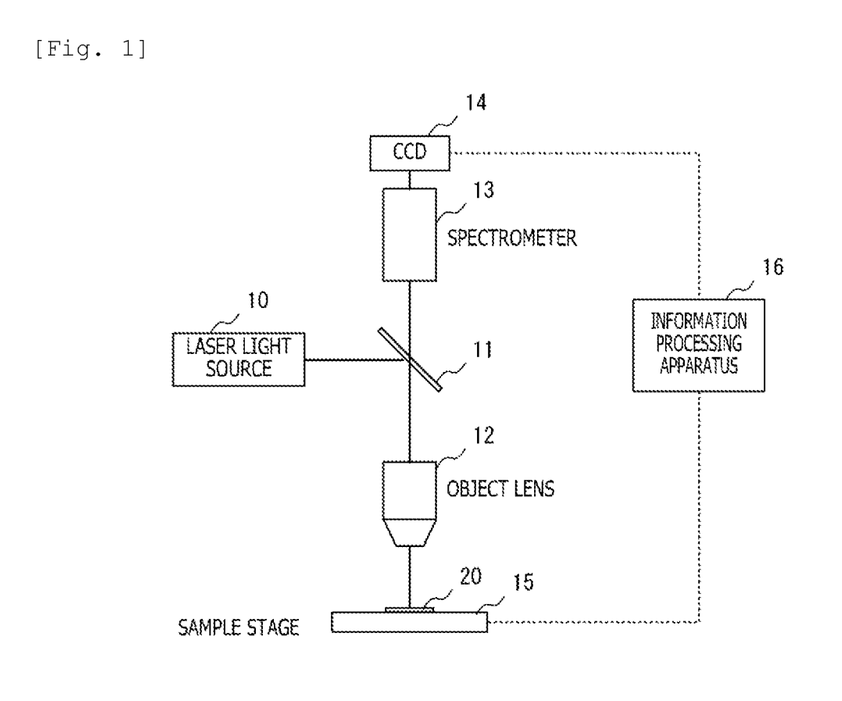
FIG. 1 is a diagram illustrating an overall configuration of a Raman scattering spectrometric apparatus according to an embodiment.

As shown in FIG. 1, the Raman scattering spectrometric apparatus according to one embodiment of the present invention includes a laser light source 10, a beam splitter 11, an object lens 12, a spectrometer 13, a CCD detector 14, a sample stage 15, and an information processing apparatus (PC) 16. A 3D microfluidic SERS chip 20 is placed on the sample stage 15, and an analyte solution is introduced into a channel in the 3D microfluidic SERS chip 20. In this state, an excited laser beam is emitted from the laser light source 10 and focused by the object lens 12. The induced Raman scattered light is input to the spectrometer 13 via the object lens 12 and beam splitter 11 and separated into spectral components. The CCD detector 14 is disposed such as to be able to detect a predetermined wavenumber range of the Raman shift. The Raman signals detected by the CCD detector 14 are sent to the information processing apparatus 16 where the signals are analyzed, displayed, and recorded. The information processing apparatus 16 also controls the laser light source 10, CCD detector 14, and sample stage 15.

The 3D microfluidic SERS chip 20 (hereinafter also referred to simply as "chip 20") has a channel (fluidic structure) formed with a nanostructure of a metal thin film. The chip 20 is described briefly here since the present inventors have already disclosed its structure and fabrication method in NPL 3. While NPL 3 describes fabrication of metal nano-dot structures (2D structures), it is also possible to adopt nano-ripple structures (lines and space patterns, or 1D structures).

Figure 2:
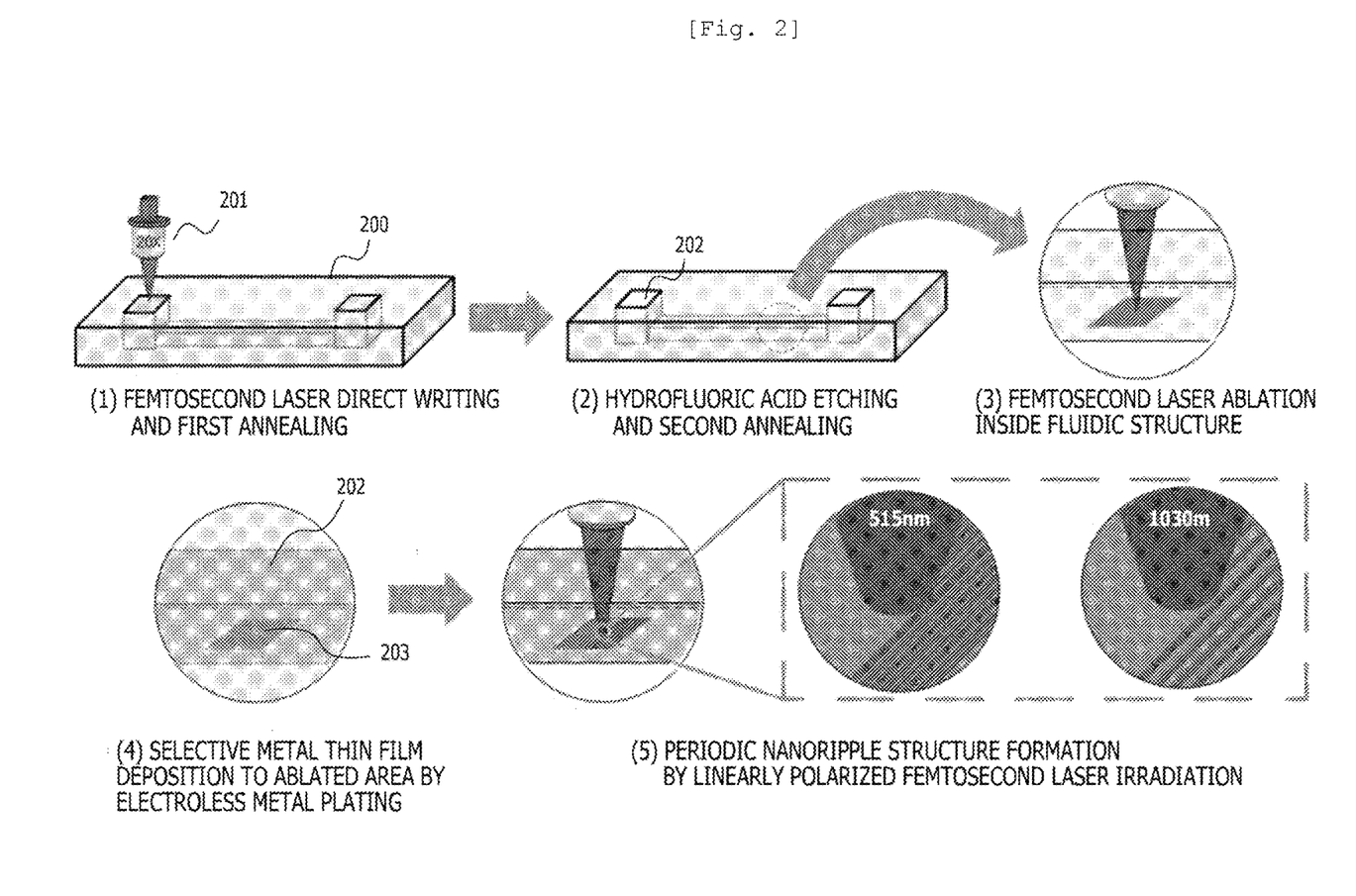
FIG. 2 is a diagram for explaining a fabrication method of a 3D microfluidic SERS chip that has a microfluidic structure and a metal nanostructure.

FIG. 2 is a diagram for explaining the fabrication method of the chip 20. First, a photosensitive glass 200 is subjected to direct writing with a femtosecond laser 201 and first annealing (FIG. 2(1)), and successively to hydrofluoric acid etching and second annealing to form a 3D fluidic structure (channel) 202 inside the photosensitive glass 200 (FIG. 2(2)). After that, using the same femtosecond laser 201, the interior of the 3D fluidic structure 202 is selectively ablated (FIG. 2(3)), and a metal thin film 203 is selectively deposited only in the ablated areas by electroless metal plating (FIG. 2(4)). The metal thin film 203 is composed of copper (Cu) and silver (Ag) deposited thereon, for example. Lastly, the metal thin film 203 is irradiated with a linearly polarized femtosecond laser with an intensity near the ablation threshold to form a periodic nanoripple structure (FIG. 2(5)). The nanostructure is fabricated with a femtosecond laser having a second harmonic wavelength of 515 nm to minimize its size. A periodic nano-dot structure can be formed by irradiating the formed nanoripple again with the femtosecond laser from a polarization direction rotated at 90 degrees. Alternatively, the nano-ripple may be irradiated again with the femtosecond laser with the glass substrate rotated at 90 degrees while the polarization direction is maintained the same, to form a periodic nano-dot structure.

The microfluidic structure fabricated in this embodiment is 300 µm in width, 90 µm in height, and 2000 µm in total length, for example, 210 μm below the upper face of the glass substrate, and connected to two openings (each being 500 μm×500 μm×300 μm). The nanoripple structure has an average period of 140 nm and an average distance between grooves of 43 nm, for example.

Measurement Method

The measurement method in this embodiment will be described in more detail with reference to FIG. 3. FIG. 3(a) is a diagram illustrating the entire 3D microfluidic SERS chip 20, and (b) is a diagram illustrating a part of the channel 202 in the chip 20 around a laser-irradiated area to a larger scale.

First, an analyte solution 210 (e.g., Rhodamine 6G, or R6G) is introduced into the channel 202 from one opening of the fabricated 3D microfluidic SERS chip 20. The introduction of the analyte solution 210 is performed with a micro syringe, for example. In introducing the analyte solution 210, the channel 202 is filled not fully but only partly with the analyte solution 210. For example, the analyte solution 210 is introduced into the channel 202 so that an irradiation area of the laser beam 211 is filled with the analyte solution 210 and that the liquid interface of the analyte solution 210 is slightly outside the irradiation area of the laser beam 211.

Figure 4:
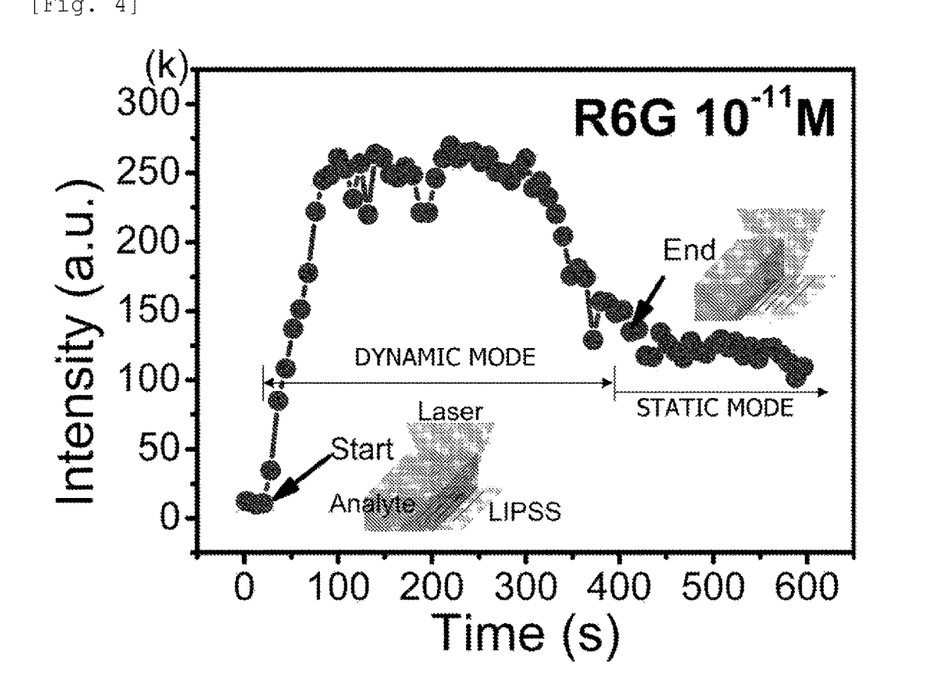
FIG. 4 is a graph showing time series of the Raman signal intensity measured by the Raman scattering spectroscopic method according to the embodiment.

An excited laser beam is emitted from the laser light source 10 in this state to start Raman measurement. FIG. 4 shows the time series of the Raman signal intensity during the Raman measurement of a $10^{-11}$ M R6G solution from the start of the dynamic mode.

At the start of the measurement, the analyte solution 210 is present over the entire laser-irradiated area so that the measurement takes place similarly to that of NPL 3, the Raman enhancement factor being about $10^8$. Accordingly, no Raman signal is detected from the $10^{-11}$ M R6G solution.

As time passes, the analyte solution 210 evaporates so that, as shown in FIG. 3(b), the interface between the liquid and the air is irradiated with the laser beam 211. As a result, the Raman signal intensity increases rapidly as shown in FIG. 4, and the Raman signal is acquired consistently with the enhanced intensity for a certain period of time (dynamic mode). In this experiment, the signal started to increase and reached the maximum level in about 30 seconds, after which the maximum level was maintained for about 3 minutes.

As time progresses further, the liquid interface moves gradually away from the laser-irradiated area so that the signal intensity lowers. Nevertheless, after the analyte solution 210 within the laser-irradiation area has completely evaporated, a constant signal intensity (about half of that of the dynamic mode) is continuously acquired (static mode), this signal intensity being far higher than that obtained when the laser beam is emitted into the solution.

Figure 5:
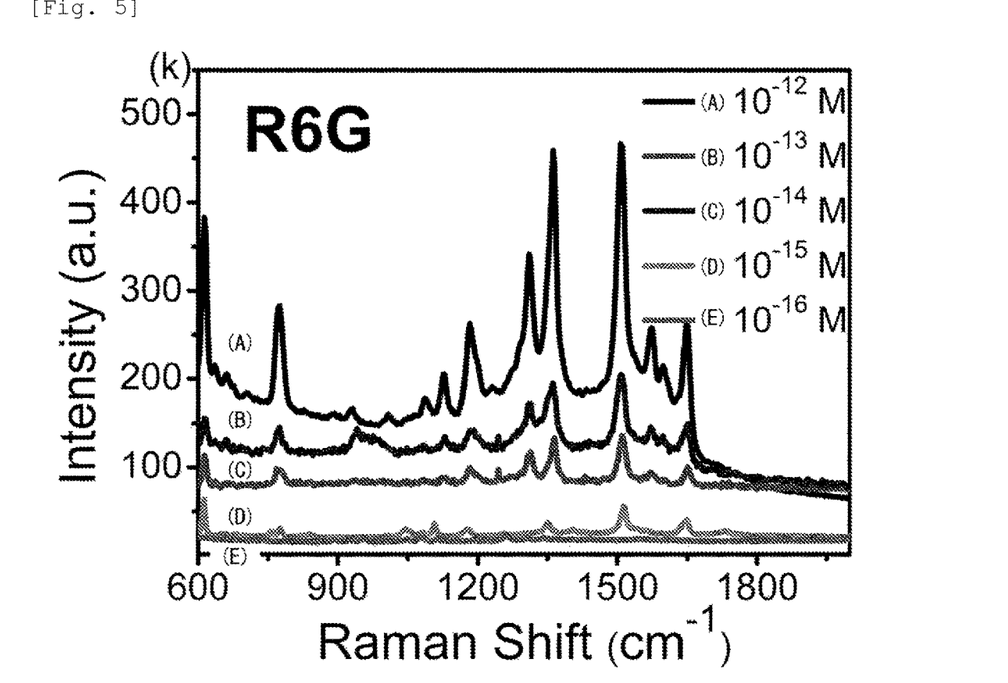
FIG. 5 is a graph showing the Raman spectra of R6G solutions with different condensations measured by the Raman scattering spectroscopic method according to the embodiment.
Figure 6:
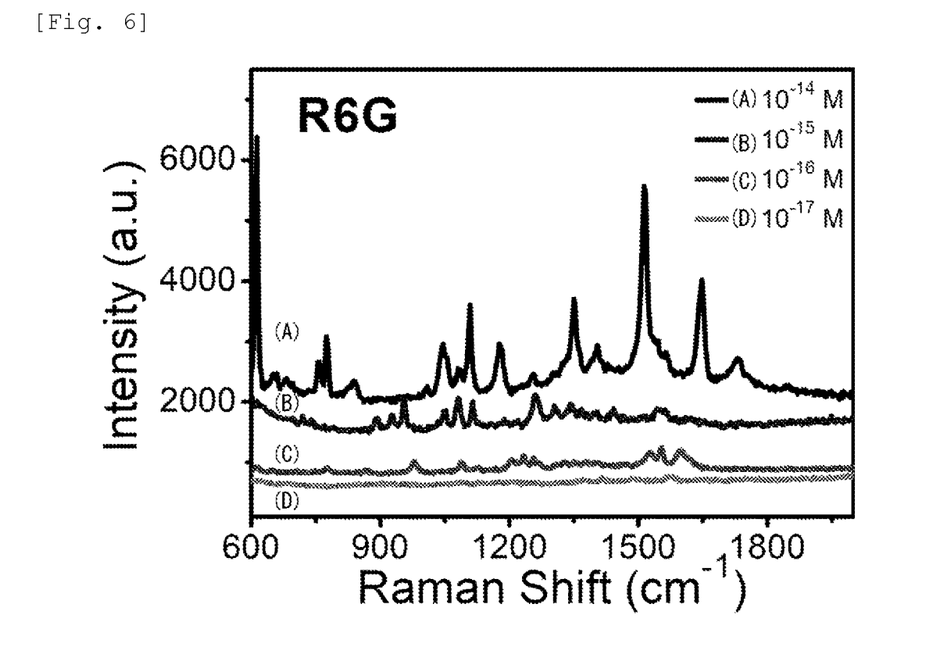
FIG. 6 is a graph showing the Raman spectra of R6G solutions with different condensations measured by the Raman scattering spectroscopic method according to the embodiment.

FIG. 5 and FIG. 6 show the Raman spectra acquired in the dynamic mode when measurement was made using a 3D microfluidic SERS chip having a metal thin film with a nano-ripple structure and R6G solutions with different condensations as the targets. FIG. 5 shows the results of measurement targeting $10^{-12}$ M to $10^{-16}$ M solutions, and FIG. 6 shows the results of measurement targeting $10^{-14}$ M to $10^{-17}$ M solutions. These results show that peak detection is possible for R6G with a concentration of as low as $10^{-16}$ M (100 aM).

Figure 7:
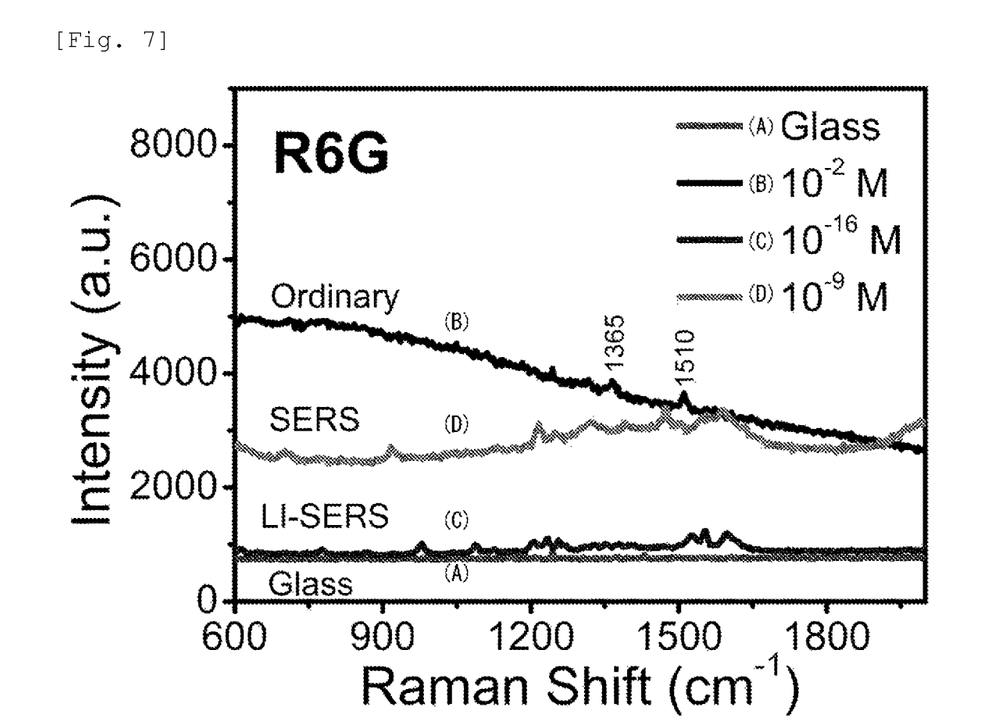
FIG. 7 is a graph for explaining detection limits of the present technique (LI-SERS) and other techniques.

FIG. 7 is a graph for explaining detection limits of several techniques, comparing the detection limits of the present technique (LI-SERS), an ordinary Raman measurement (Ordinary), and a surface-enhanced Raman measurement (SERS). As shown, while the detection limit of the ordinary Raman measurement is $10^{-2}$ M, the present technique allows detection at as low as $10^{-17}$ M, which is a 14-digit improvement. "Glass" represents the Raman measurement results of a glass substrate. As can be seen, no Raman signal is obtained from the glass substrate, showing that it does not affect the measurement.

In this measurement, the enhancement factor (EF) is $EF_{dynamic}=3.2\times10^{13}$ and $EF_{static}=1.5\times10^{12}$ in the dynamic mode and static mode, respectively. Here, the enhancement factor is defined by $EF=(I_{SERS}/I_{OR})/(C_{SERS}/C_{OR})$ wherein $I_{SERS}$ and $I_{OR}$ respectively represent the Raman signal intensities of R6G on the SERS substrate and the glass substrate, and $C_{SERS}$ and $C_{OR}$ represent the respective molar concentrations.

Figure 8:
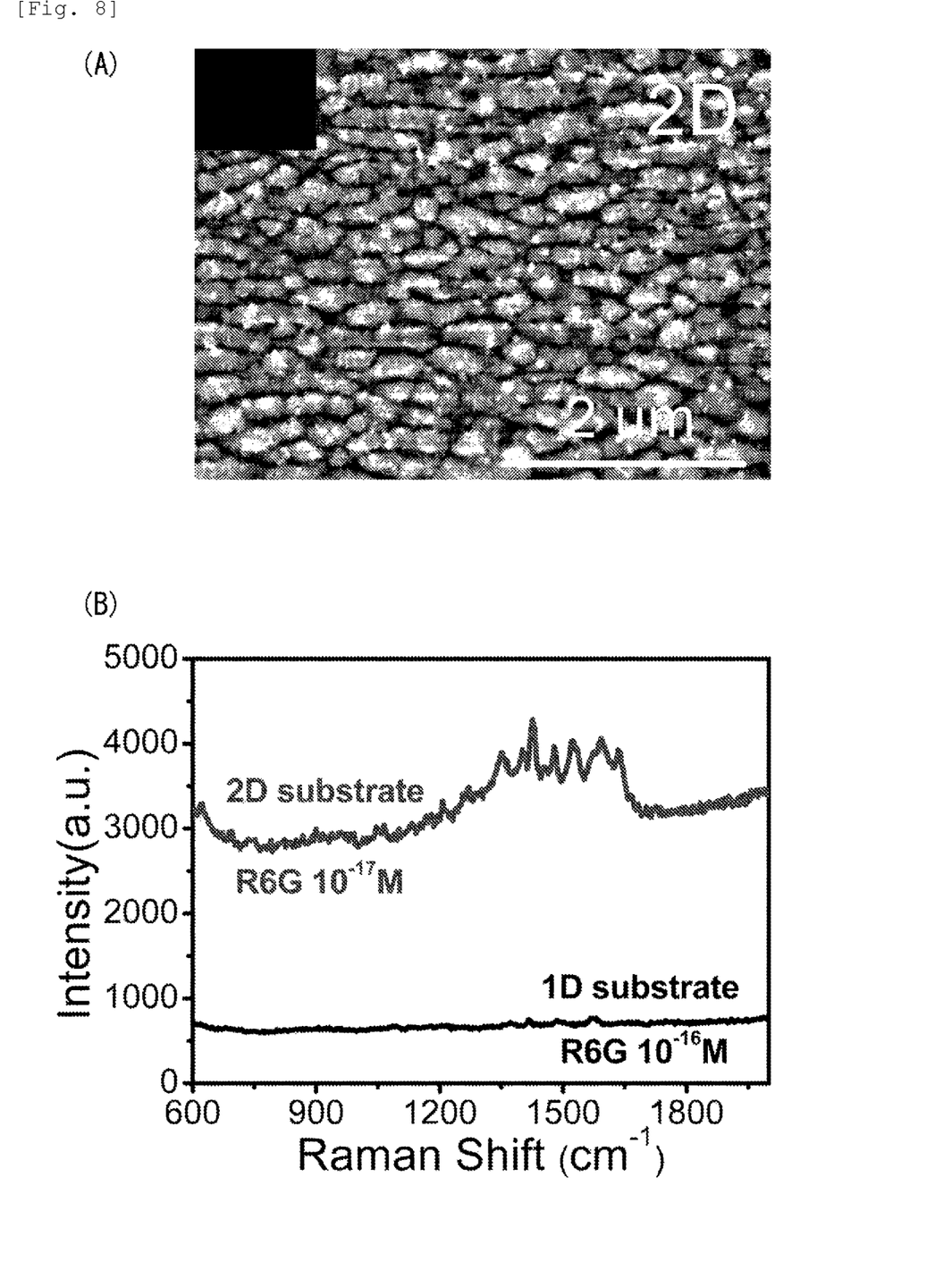

Similar measurements were also made using a 3D microfluidic SERS chip having a metal thin film with a nano-dot structure. FIG. 8(A) is a scanning electron microscope (SEM) image of the nano-dot structure, which is an array of dots with an average size of about 250 nm at an interval of about 50 nm. FIG. 8(B) shows a Raman spectrum of R6G with a concentration of $10^{-17}$ M on the nano-dot structure, and a Raman spectrum of R6G with a concentration of $10^{-16}$ M on a nano-ripple structure. The use of the nano-dot structure leads to an increase in enhancement factor EF as high as to $1.52\times10^{14}$, which makes the detection limit 10 aM or lower.

The enhancement factor EF in conventional SERS measurements is approximately in the range of from $10^5$ to $10^9$, the detection limit being about 1 μM to 1 pM. With the technique of NPL 3, the enhancement factor EF is about $10^8$, and the detection limit is about 1 nM. No enhancement factor has been reported regarding the transient SERS of NPL 1 and NPL 2, which allows detection at 10 aM only for a limited period of time. The present technique is capable of continuous Raman measurement with a detection limit in the range of 10 aM to 100 aM. The enhancement factor can be increased even more to improve the detection limit by further reducing the spacing in the nanostructure of the metal thin film.

While the mechanism by which the present technique enhances the Raman signal intensity has not been fully clarified yet, it is assumed to be caused by R6G molecules that are decomposed by the heat generated by laser irradiation of the metal and gather around the metal nanostructure due to Marangoni convection, which is created at the same time by the heat in the solution. Some of the R6G molecules gathering around the metal nanostructure are assumed to remain on the metal thin film even after the liquid has evaporated, making the static mode analysis possible. In fact, the presence of remnant deposition in the laser-irradiated area after evaporation of the liquid has been confirmed.

Figure 9:
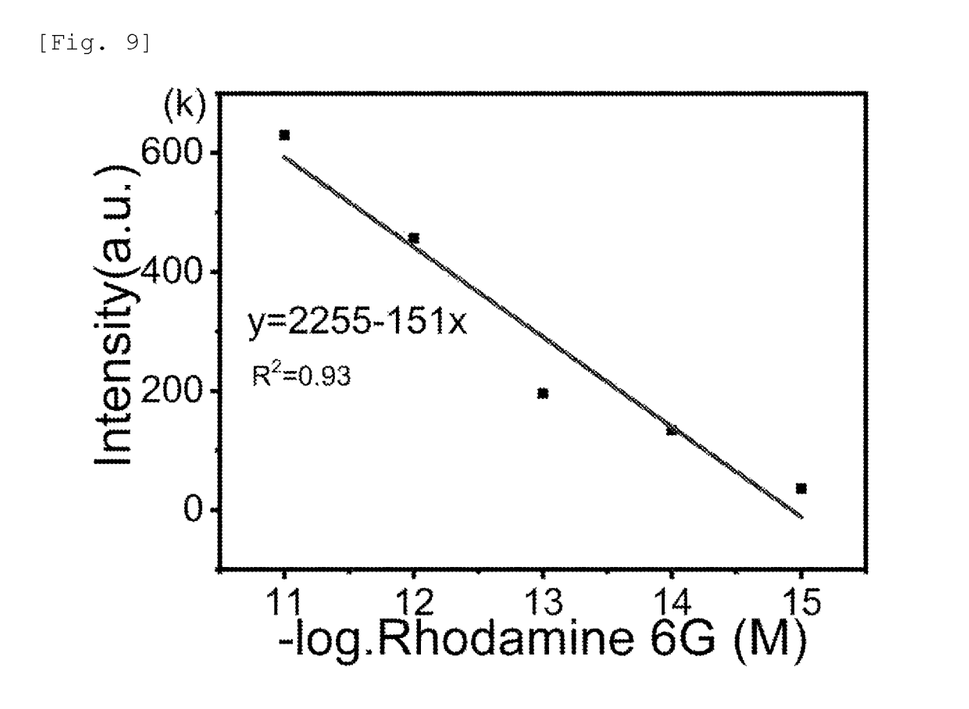
FIG. 9 is a graph showing the relationship between the concentration of the analyte solution used in the Raman scattering spectroscopic method according to the embodiment and the Raman signal intensity.

FIG. 9 is a graph showing the intensity of Raman signals acquired from $10^{-11}$ to $10^{-15}$ M R6G solutions by the present technique (LI-SERS). It shows that there is a linear correlation with a coefficient of determination of $R^2=93\%$ between the concentration and the detection signal intensity in the R6G concentration range of pM to fM. Accordingly, the present technique allows for a quantitative measurement of the sample.

Figure 10:
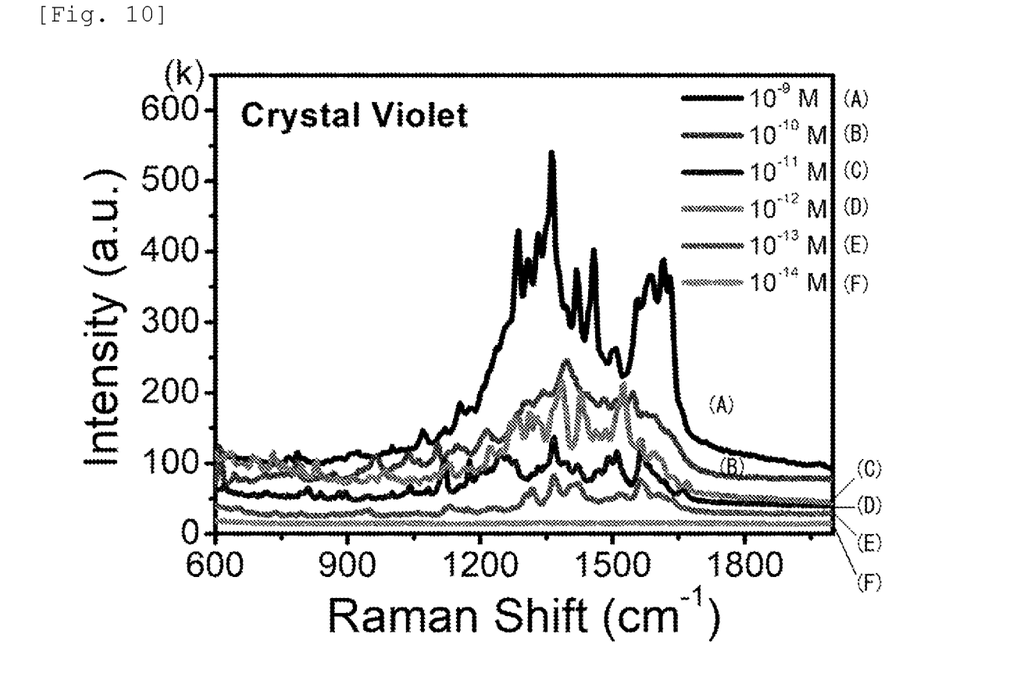
FIG. 10 is a graph showing the Raman spectra of crystal violet solutions with different condensations measured by the Raman scattering spectroscopic method according to the embodiment.

The present technique is also applicable to other solutions than R6G. FIG. 10 is a graph showing the results of measurement of Raman spectra of crystal violet solutions in dynamic mode. The detection limit of crystal violet is about $10^{-14}$ M.

The above shows that the present technique (LI-SERS) enables a continuous Raman measurement of not only specific samples but a wider variety with the detection limit of fM to aM. The present technique is also expected to find applications in a wider range of fields for realizing ultrahigh-sensitivity rapid material analysis, pathological diagnosis, environmental measurement, and food safety control.

Variation Example

The present invention is not limited to the specific configurations described above and allows various modifications to be made within the technical concept shown in the present disclosure.

The 3D microfluidic SERS chip or metal nanostructure for example may be of other materials or sizes than those described above. While the enhancement factor can be further increased by making the metal nanostructure even finer as already mentioned, it is also possible to perform liquid-interface assisted SERS with a lower enhancement factor, using a metal nanostructure of a larger size than those mentioned above. Other metal nanostructures than nano-ripple structures or nano-dot structures, or dispersed metal nano-particles may also be used. The width, height, and length of the microfluidic channel are not limited to particular ranges. While the height should preferably be set in an appropriate range, the width and length can be as large as desired. The channel may have any length in the width direction.

In the description above, the laser irradiation position and 3D microfluidic SERS chip position are fixed during the measurement so that the liquid interface of the analyte solution moves away from the laser-irradiated area as time passes. Instead, the laser irradiation position may be moved relative to the chip in accordance with the movement of the liquid interface as the analyte solution evaporates. To carry out this control, for example, the information processing apparatus 16 may acquire an image of the laser-irradiated area, and move the sample stage 15 following the position of the liquid interface. This configuration allows for continuous measurement in the dynamic mode since the liquid interface of the analyte solution is always positioned at the laser-irradiated area.

REFERENCE SIGNS LIST

10 Laser light source 11 Beam splitter 12 Object lens 13 Spectrometer 14 CCD detector 15 Sample stage 3D microfluidic SERS chip 200 Photosensitive glass 201 Femtosecond laser 202 3D fluidic structure (channel) 203 Metal thin film 204 Nanostructure

The invention claimed is:

1. A Raman scattering spectrometric apparatus, comprising:
    an irradiation unit configured to emit a laser beam;
    a chip having a channel in which a metal nanostructure is formed;
    a solution introducing unit configured to introduce an analyte solution into the part of the channel in the chip; and
    a measuring unit configured to measure Raman scattering light induced by irradiation with the laser beam;
    wherein a measurement is performed by irradiating the laser beam along a liquid-air interface of the analyte solution formed on the metal nanostructure, wherein a direction of the laser beam irradiation is parallel to and along the interface; and
    wherein the apparatus further comprises a control unit that acquires an image of the laser-irradiated area and moves a sample stage following a position of the liquid-air interface such that there is a continuous measurement where the liquid-air interface of the analyte solution is positioned at the laser-irradiated area as the interface moves due to evaporation.

2. The Raman scattering spectrometric apparatus according to claim 1, wherein the metal nanostructure comprises a nano-dot structure or a nano-ripple structure.

3. A Raman scattering spectrometric method, comprising:
    preparing a chip having a channel in which a metal nanostructure is formed;
    introducing an analyte solution into a part of the channel in the chip;
    irradiating the analyte solution formed on the metal nanostructure with a laser beam, wherein the analyte solution is present over the entire irradiation area;
    measuring Raman scattering light induced by the irradiation of the laser beam; and
    continuing the Raman measurement as the analyte solution evaporated until the laser beam is along a liquid-air interface of the analyte solution, wherein a direction of the laser beam irradiation is parallel to and along the interface.

4. The Raman scattering spectrometric method according to claim 3, wherein the metal nanostructure comprises a nano-dot structure or a nano-ripple structure.

5. A Raman scattering spectrometric method comprising:
    preparing a chip having a channel in which a metal nanostructure is formed;
    introducing an analyte solution into a part of the channel in the chip;
    irradiating the analyte solution formed on the metal nanostructure with a laser beam;
    measuring Raman scattering light induced by the irradiation of the laser beam;
    acquiring an image of the laser-irradiated area; and
    moving a sample stage following a position of the liquid-air interface such that there is a continuous measurement where the liquid-air interface of the analyte solution is positioned at the laser-irradiated area as the interface moves due to evaporation, wherein a direction of the laser beam irradiation is parallel to and along the interface.

* * * * *